May 19, 1953     J. D. ANDERSON     2,638,954
NONSKID ATTACHMENT
Filed Feb. 19, 1951
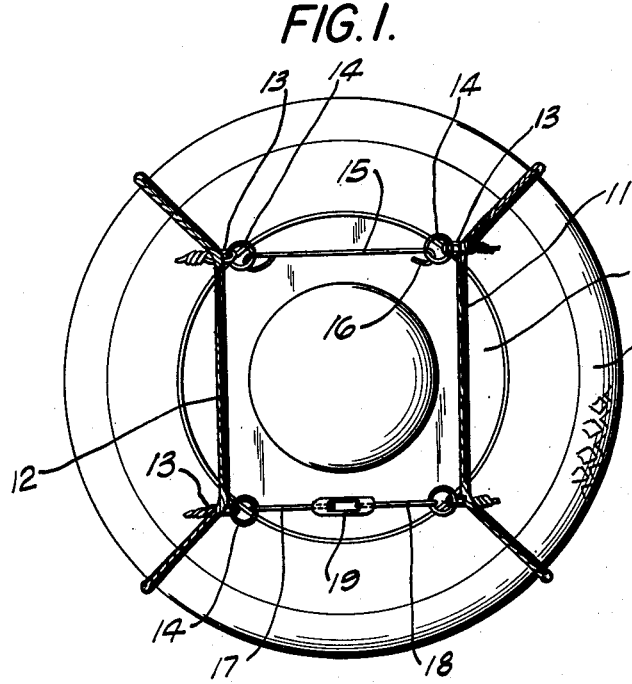
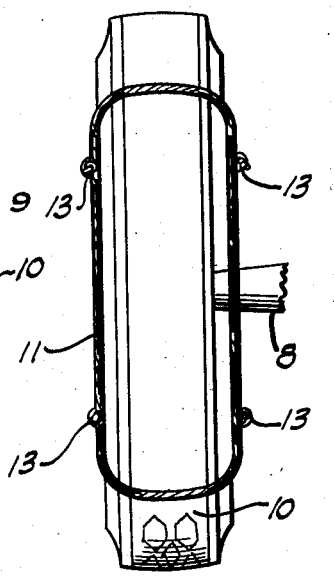
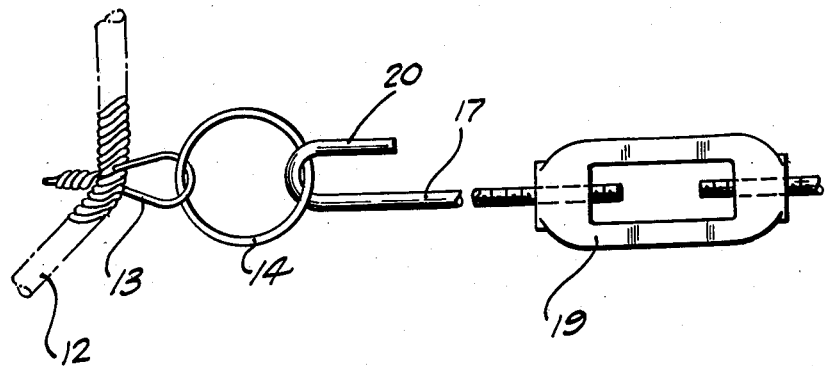
INVENTOR.
JAMES D. ANDERSON.
BY
ATTORNEY.

Patented May 19, 1953

2,638,954

UNITED STATES PATENT OFFICE 2,638,954

NONSKID ATTACHMENT

James D. Anderson, Detroit, Mich.

Application February 19, 1951, Serial No. 211,655

1 Claim. (Cl. 152—221)

My invention relates to a new and useful improvement in a non-skid attachment adapted for use on vehicle wheels for the purpose of preventing the wheel from spinning and also for preventing the wheel from skidding on the surface over which it is being propelled. Various kinds of attachments have been used for this purpose and among these is a structure which is commonly referred to as a tire chain. In the commonly accepted form of tire chain the tire chain is extended around the periphery of the wheel and secured together at its opposite ends. In order to mount the tire chain on the wheel it is sometimes customary to jack up the wheel in order to push the tire chain around the lower part of the wheel. Another method of attaching the tire chain is to lay the chain down in the path of the wheel and drive the vehicle onto the chain but this, of course, cannot be done if the vehicle has already become stuck. Even where the vehicle is movable, to place the tire chain on the wheel in this manner is a very difficult task, that is to thrust the tire chain between the periphery of the tire and the fender. The disagreeableness of such a method of fastening a tire chain on a wheel will become obvious when it is considered that the road is frequently in a muddy condition. It is an object of the present invention to provide an anti-skid attachment which may be easily and quickly attached to the vehicle wheel without the inconvenience referred to.

It is another object of the invention to provide a non-skid attachment which may be easily and quickly secured to the vehicle wheel both above and below the axle without necessitating the elevating of the vehicle wheel from the surface on which it rests and without necessitating a movement either forwardly or rearwardly of the vehicle.

Another object of the invention is the provision of an attachment whereby the vehicle may be provided with a non-skid attachment and traction produced.

It is another object of the invention to produce an attachment which may be attached very easily and quickly and one which is highly efficient in use.

Another object of the invention is the provision of an attachment of this class which will be simple in structure, economical of manufacture and durable in use.

It is recognized that various modifications and changes may be made in the detail of structure illustrated and it is intended that the present disclosure be considered but the preferred embodiment of the invention.

Forming a part of this application are drawings in which,

Fig. 1 is a side elevational view of a vehicle wheel showing the invention attached.

Fig. 2 is an end elevational view of the vehicle wheel showing the invention attached.

Fig. 3 is a fragmentary elevational view slightly enlarged illustrating a portion of the invention.

In the drawings I have shown an axle 8 on which is mounted a vehicle wheel 9 carrying the usual type of vehicle wheel tire 10. The invention comprises a pair of endless loops 11 and 12 and formed from rope, cable, or other suitable flexible material. The length of the rope or cable from which each of the loops is made is less than twice the outside diameter of the tire on the vehicle wheel, so that when one of the loops is slipped onto the vehicle wheel from either side it cannot reach the center of the wheel. Each of these loops is provided with an eyelet 13 attached to which is a ring 14. The eyelets on the loop 11 are in registration with the eyelets on the loop 12 and the registering rings 14 are connected together by a rod 15 having a hook 16 at one end, excepting at the outer side the connection is made by a pair of threaded rods 17 and 18 connected together with a turnbuckle 19, each of the rods being provided at its free end with a hook 20 for engaging in a ring 14.

In assembling the device, one of the loops 11 is positioned on the wheel from the forward side and the other loop is positioned on the wheel from the rear side and these loops are then connected at their inner sides by means of the rods 15. The outer sides are then connected by means of the rod 15 and the turnbuckle bearing rods 17 and 18. The turnbuckle 19 is then tightened to shorten the distance between the hooks 20 on the ends 17 and 18, so that the flexible loops are drawn tightly into close engagement with the periphery of the tire. When this tightening has been brought about to such an extent that the loops 11 and 12 are taut the structure is in position for use. The connecting rods 15 are positioned sufficiently low so that it is not necessary to reach far up into the fender in order to properly connect the rods 15 and thus the person mounting the structure on the vehicle wheel is relieved of a likelihood of becoming muddy from contact with a muddy fender. The structure may be mounted on the wheel regardless of the nature of the road, even though the wheel has weighted itself in a deep rut, which commonly results from a spinning of the wheel in an endeavor to move the vehicle after it has become stalled. It is believed obvious that the structure may be economically manufactured and that it may be quickly placed in position, while at the same time being possessed of a minimum number of parts and having the loops 11 and 12 formed from flexible material the device may be stored in a small space in a portion of the vehicle.

In operation, when the vehicle wheel is rotated to the right, the part A of the loop 11 will be brought into contact with the surface on which the vehicle is attempted to be propelled and this part A will be forced to move slightly counter-clockwise and this movement effects a similar counter-clockwise movement of the part B of the loop, but experience has shown that the part B will not move as far as the part A so that a greater tautness of the loops 11 and 12 is effected. Experience has shown that when these parts A and B of the loops are brought into contact with the road or street, traction is obtained sufficient to permit the vehicle to propel itself out of very deep ruts and sufficient contact with a road or street is obtained to prevent skidding or swaying on icy surfaces, so that there is thus provided a structure which may be used on roads of sand, ice, snow or mud in a very effective manner. It is believed obvious that the device may be easily and quickly removed when it is no longer needed, as it is but necessary to unscrew the turnbuckle 9 and disengage the rods 15. There is thus provided a device which may be easily and quickly attached and which will eliminate to a large degree traffic jams resulting from a stalled car and also avoid the necessity of obtaining the services of a tow car for pulling a stalled car out of its stalled position.

What I claim is:

A non-skid attachment for vehicle wheels of the class described adapted for mounting on a vehicle wheel having a tire, comprising a pair of endless loops of flexible cord, the material of each of said loops being less than twice the diameter of the vehicle wheel tire and positioned on the tire with an equal portion of each loop lying at opposite sides of the tire and a connecting rod at each side of the vehicle wheel connecting the oppositely disposed loops together at one side of the center of the wheel; and a connecting member at each side of the vehicle wheel connecting both of said loops together at the opposite side of the center of the wheel, one of said connecting members being adjustable into a position for stretching said loops into taut condition in direct embracing engagement with the periphery of the tire.

JAMES D. ANDERSON.

References Cited in the file of this patent

UNITED STATES PATENTS

| Number | Name | Date |
| --- | --- | --- |
| 1,101,198 | Lashar | June 23, 1914 |
| 1,447,040 | Richards | Feb. 27, 1923 |
| 2,065,810 | Karon | Dec. 29, 1936 |

FOREIGN PATENTS

| Number | Country | Date |
| --- | --- | --- |
| 830,563 | France | Aug. 3, 1938 |